June 8, 1965  J. P. ZAWACKI ET AL  3,188,049
GATE VALVE
Filed Jan. 3, 1962  3 Sheets-Sheet 1
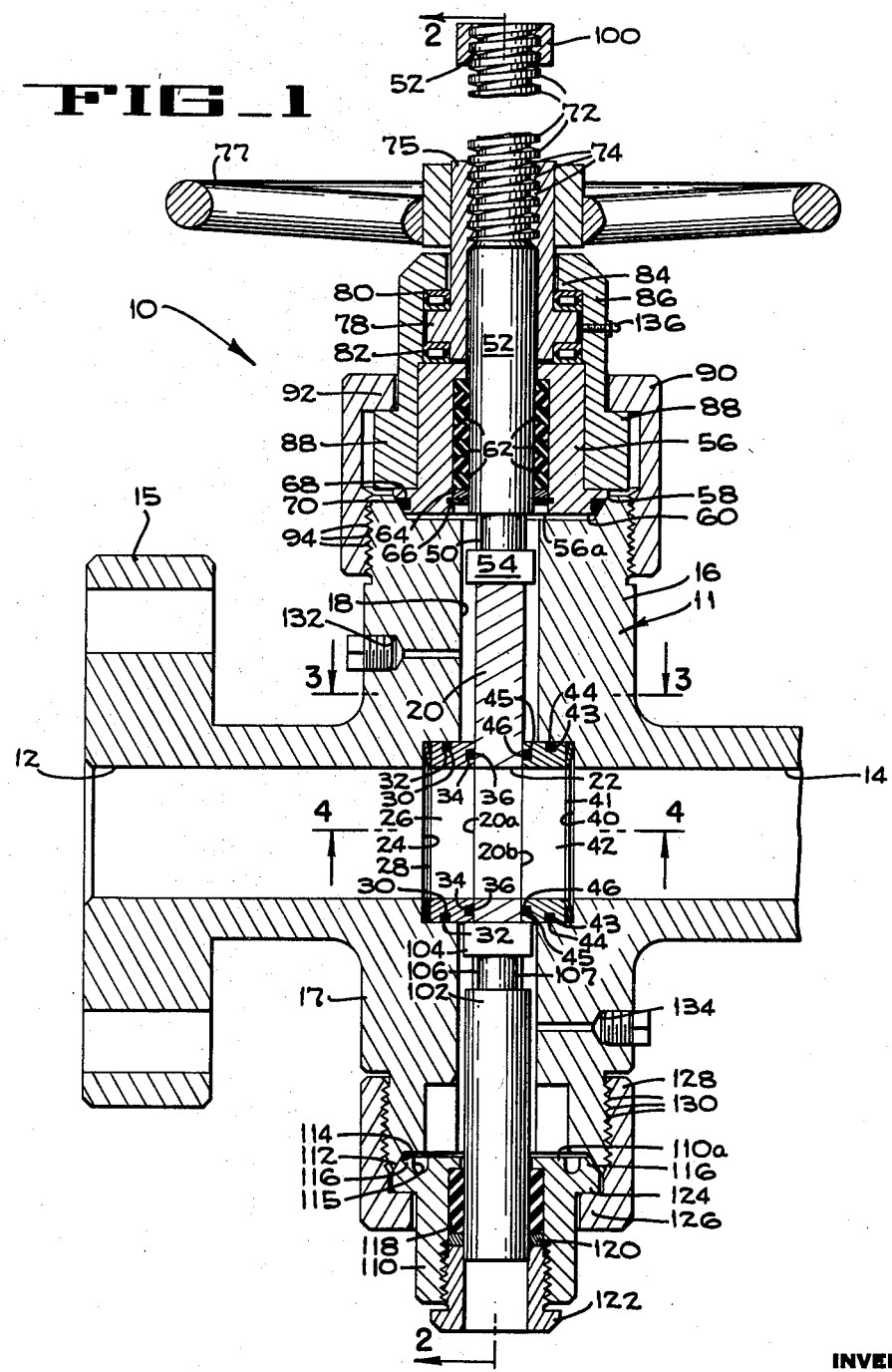
FIG_1
INVENTORS
JOHN P. ZAWACKI
JOHN R. YANCEY
BY Hans G. Hoffmeister
ATTORNEY June 8, 1965 J. P. ZAWACKI ET AL 3,188,049
GATE VALVE
Filed Jan. 3, 1962 3 Sheets-Sheet 2
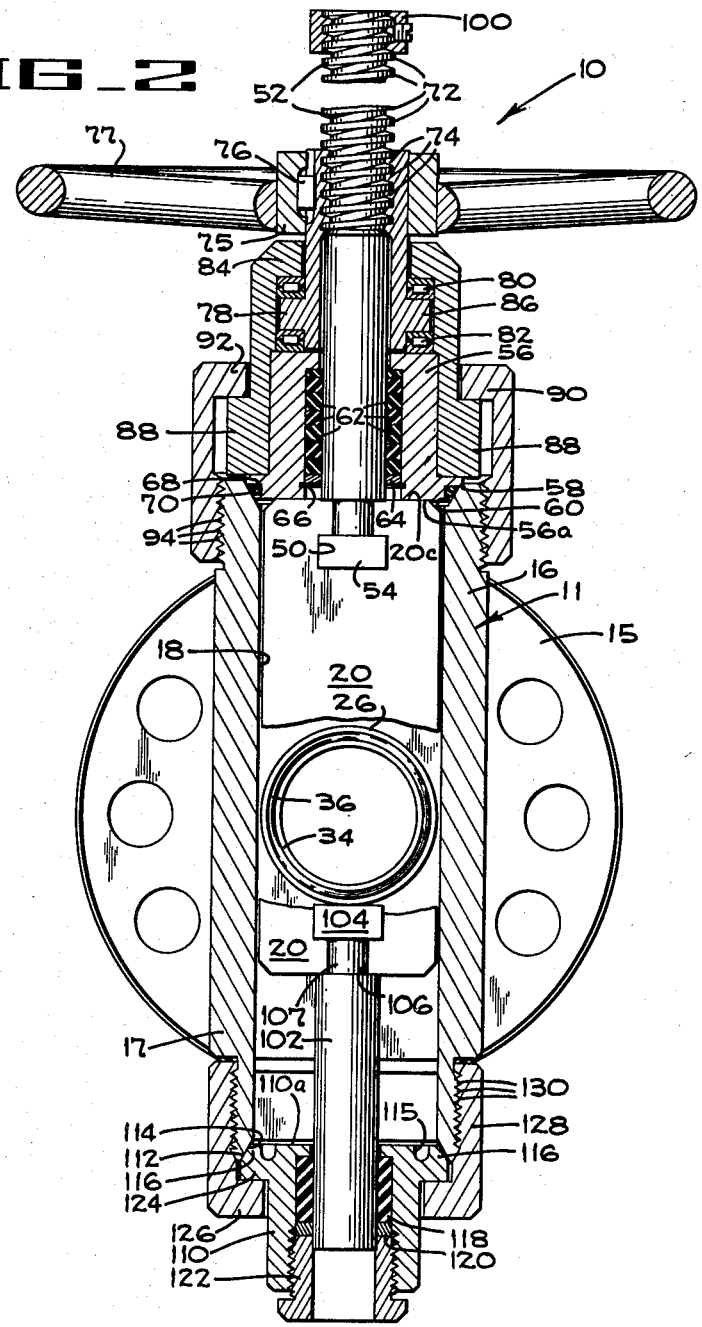
INVENTORS
JOHN P. ZAWACKI
JOHN R. YANCEY
BY Hans G. Hoffmeister
ATTORNEY June 8, 1965  J. P. ZAWACKI ET AL  3,188,049
GATE VALVE
Filed Jan. 3, 1962  3 Sheets-Sheet 3
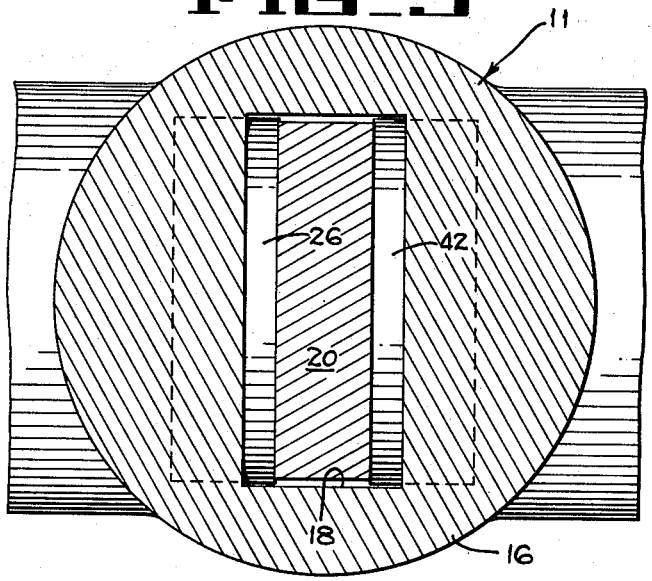
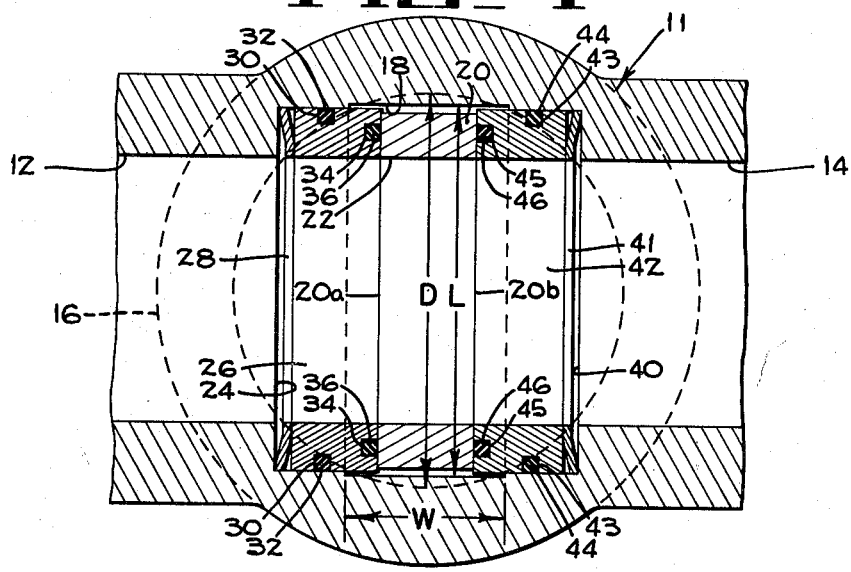
INVENTORS
JOHN P. ZAWACKI
JOHN R. YANCEY
BY *Hans G. Hoffmeister*
ATTORNEY

3,188,049
GATE VALVE
John P. Zawacki and John R. Yancey, Houston, Tex., assignors, by mesne assignments, to FMC Corporation, San Jose, Calif., a corporation of Delaware
Filed Jan. 3, 1962, Ser. No. 164,056
3 Claims. (Cl. 251—327)

The present invention pertains to valves and more particularly relates to gate valves that are adapted for use in handling highly pressurized fluids.

An object of the present invention is to provide an improved high pressure gate valve.

Another object is to provide in a gate valve improved means for positively sealing the same, when closed, against seepage of fluid through the valve.

These and other objects and advantages of the invention will become apparent from the following description and the accompanying drawings, in which:

FIG. 1 is a fragmentary axial section through the valve, with the plane of the section coincident with the axis of the flow passageway therethrough.

FIG. 2 is a partly broken away section taken along line 2—2 of FIG. 1.

FIG. 3 is a section taken along line 3—3 of FIG. 1.

FIG. 4 is a section taken along line 4—4 of FIG. 1.

The valve 10 of the present invention comprises a housing 11 (FIG. 1) having aligned passageways 12 and 14 therein, either of which can serve as either the inlet or the outlet so that the valve can be used to control flow in either direction. The housing 11 is provided with a flange 15 (FIG. 1) adjacent the outer end of the passageway 12 to facilitate connection of said passageway with a suitable conduit (not shown). A similar flange (not shown) is formed adjacent the outer end of the passageway 14.

The housing 11 includes upper and lower extensions 16 and 17, respectively, and a rectangularly shaped chamber 18 (FIGS. 1–4) extends through the body 11 transversely with respect to the axis of the pasasgeways 12 and 14 and through both extensions 16 and 17. A rectangularly shaped plate, or gate, 20 is mounted for movement within the chamber 18. The plate 20 is provided with a circular port 22 which is adapted to be aligned with, or moved out of alignment with, the passageways 12 and 14 by movement of the plate 20 within the transverse chamber 18.

The housing 11 is counterbored, as indicated at 24, adjacent the inner end of the passageway 12. An annular seat element 26 is slidably mounted within the counterbore 24 and is urged into tight engagement with the adjacent face 20a of the plate 20 by a Belleville, or washer-type, spring 28 mounted within the counter-bore behind the annular seat element 26. The outer surface of the seat element 26 is provided with an annular groove 30 within which an O-ring 32 is mounted for sealing against the circumferential wall of the counterbore 24. The face of the annular seat element 26 which is adjacent the plate 20 is also provided with an annular groove 34 in which a sealing ring 36 of "Teflon" or other sealing material is mounted. The ring 36 is adapted to seal against the adjacent plane face 20a of the plate 20.

The housing 11 is similarly counterbored, as indicated at 40, adjacent the inner end of the passageway 14 and an annular seat element 42, similar to seat element 26, is mounted in the counterbore 40 and is pressed against the adjacent plane face 20b of the plate 20 by a Belleville, or washer-type, spring 41 mounted within the counterbore 40 behind the seat element 42.

The outer surface of the seat element 42 is provided with an annular groove 43 which receives an O-ring 44, and the end face of the ring is grooved as at 45 to receive a sealing ring 46, which is similar to the ring 36. The ring 46 seals against the adjacent plane face 20b of the gate 20.

It will be apparent that the annular seat elements 26 and 42 must be inserted through the gate-receiving chamber 18. For this reason the chamber is made having a dimension L (FIG. 4) which is greater than the outside diameter of the annular seat element and the chamber has a width W which is greater than the length of the annular seat element. The width and thickness of the gate member are also slightly less than the dimensions L and W of the gate-receiving chamber 18.

The upper end of the plate 20 (FIG. 1) is provided with an inverted T-shaped slot 50. The stem of cylindrical operating rod 52 for the valve is provided at its lower end with a square head 54 which is slidably received within the inverted T-shaped slot 50.

A stuffing box 56 surrounds the stem 52 and is provided on its lower end with a frusto-conical surface 58 which mates with a complementary surface 60 formed in the end of the housing 11. Annular packing elements 62 are placed within the stuffing box 56 and are retained therein by a thrust washer 64 and a snap ring 66. A groove 68 is formed in the frusto-conical surface 58 and an O-ring 70 is mounted therein to prevent leakage between the housing 11 and the stuffing box 56.

The outer end of the stem 52 is provided with male threads 72 which engage female threads 74 in an operating nut 75. The operating nut 75 is secured by a key 76 to a hand wheel 77 and is provided with an annular external flange 78 near its lower end. Thrust bearings 80 and 82 are mounted above and below the flange 78. The lower thrust bearing 82 abuts the upper end of the stuffing box 56. The upper bearing 80 abuts an internal annular shoulder 84 formed on a valve bonnet 86, which is also provided with an outwardly projecting flange 88. A bonnet retaining nut 90, provided at its upper end with an inwardly directed flange 92, engages the flange 88 on the valve bonnet and is screwed onto threads 94 formed on the end of the valve housing 11.

When the hand wheel 77 is turned, the valve stem 52 is moved either upward or downward to move the gate 20 to its open or closed position, respectively. A stop collar 100 is fixed to the upper end of the male threads 72 on the valve stem 52 to limit downward movement of the valve stem. Upward movement of the valve stem is limited by the abutment of the upper surface 20c of the gate 20 against the lower surface 56a of the stuffing box 56.

A cylindrical balance stem 102 is connected to the lower end of the plate 20 by means of a head 104 on the balance stem 102 which engages within a T-slot 106 formed in the lower end of the plate. The head 104 is formed by machining an annular groove 107 near the inner end of the stem 102.

A stuffing box assembly 110 surrounds the balance stem 102 and is provided with a frusto-conical surface 112 which mates with a complementary surface 114 on the lower end of the housing 11. An annular groove 115 formed in the inner face 110a of the stuffing box 110 adjacent the peripheral edge thereof permits slight radial flexing of the lip 116 in response to high fluid pressure within the housing 11, thereby ensuring tight sealing engagement of the surface 112 with the surface 114. Packing material 118 surrounds the balance stem 102 within the stuffing box 110 and is retained therein by a thrust washer 120 and a packing gland nut 122.

The inner end of the stuffing box 110 is provided with an external annular flange 124 which is engaged by an annular shoulder 126 on a retaining nut 128 that is screwed onto threads 130 provided on the housing 11 adjacent the lower end thereof. Ports 132 and 134 (FIG. 1) are provided in the housing 11 to permit injection of valve grease into the gate receiving chamber 18 for lubricating the movable parts of the valve. Similarly, a grease fitting 136 is provided on the valve bonnet 86 to permit lubrication of the thrust bearings 80 and 82.

The nut 90 performs the dual function of retaining the bearings 80 and 82 in engagement with the nut flange 78 and of maintaining the stuffing box 56 in sealed engagement with the frusto-conical surface 60 at the upper end of the body 11. It will be apparent that the smallest diameter D (FIG. 4) of the beveled surface 60 on which the stuffing box 56 seats must be slightly greater than the dimension L of the gate-receiving chamber to permit insertion and removal of the gate 20 through the top of the valve body 11 and since the annular seat elements 26 and 42 correspond in axial length to the thickness of the gate 20, their insertion and removal also requires that the dimension D be slightly greater than the dimension L. The frusto-conical surface 114 on which the lower stuffing box 110 seats likewise is dimensioned to permit the seat elements 26 and 42 and the gate 20 to pass therethrough so that the gate and annular seat elements can be inserted and removed through the bottom of the valve body if desired.

When it is desired to close the valve 10 to shut off flow through the passageways 12 and 14, the hand wheel 77 is rotated to move the stem 52 downward, thus moving the plate 20 and balance stem 102 downward so that the port 22 is no longer in alignment with the passageways 12 and 14. The square head 54 on the stem 52 prevents the stem 52 from turning when the nut 75 turns. The pressure of the fluid on the pressure side of the valve enters the counterbore behind the annular valve seating element 26 or 42, as the case may be, and forces the seating element into tighter engagement with the adjacent plane face of the plate 20. When it is desired to again establish flow through the line, the hand wheel 77 is rotated to raise the stem 52, thus raising the plate 20 until the port 22 therethrough is again in alignment with the passageways 12 and 14.

While an embodiment of the valve of the invention has been shown and described herein, it will be understood that the invention is capable of further modification and variation without departing from the principles of the invention, and that the scope of the invention should be limited only by the scope and proper interpretation of the claims appended hereto.

The invention having beeen described, that which is claimed and desired to be protected by Letters Patent is:

1. A gate valve comprising a valve body having a flow passage therethrough and an externally threaded lateral projection, said lateral projection containing a gate-receiving chamber which extends through the lateral projection and intersects the flow passage, said lateral projection having a sealing surface on the outer end thereof, a valve gate movable within said chamber, a threaded stem secured to said gate for moving the gate in said gate-receiving chamber, a stuffing box surrounding the stem for sealing thereagainst, said stuffing box having one end in sealing engagement with said sealing surface on the outer end of said lateral projection, said stuffing box having an external flange adjacent said one end thereof and an annular shoulder at the other end thereof, a bonnet for said valve placed over said stuffing box, said bonnet having an internal annular shoulder adjacent one end thereof, the other end of the bonnet being in pressure engagement with said flange of the stuffing box, a threaded stem nut having an annular flange placed between said integral annular shoulder of the bonnet and said annular shoulder of the stuffing box, said nut being engaged with said stem and rotatable to move said gate, and a nut surrounding said bonnet and engaging the external threads of the lateral projection for rotatably securing said stem nut to the stuffing box and clamping said one end of the stuffing box to said sealing surface of the lateral projection of the valve body, said internal annular shoulder of the bonnet being spaced a predetermined fixed distance from said other end of the bonnet to positively maintain running clearance for the flange of the stem nut between the internal shoulder of the bonnet and said shoulder of the stuffing box.

2. A gate valve comprising a valve body having a flow passage therethrough and an externally threaded lateral projection, said lateral projection containing a gate-receiving chamber which extends through the lateral projection and intersects the flow passage, said lateral projection having a beveled sealing surface on the outer end thereof, a valve gate movable within said chamber, a threaded stem secured to said gate for moving the gate in said gate-receiving chamber, a stuffing box surrounding the stem for sealing thereagainst, said stuffing box having a beveled end in sealing engagement with said beveled sealing surface on the outer end of said projection, said stuffing box having an external flange thereon and an annular shoulder at the other end thereof, a bonnet for said valve placed over said stuffing box, said bonnet having an internal annular shoulder adjacent one end thereof, the other end of the bonnet being in pressure engagement with said stuffing box flange, a threaded stem nut having an annular flange between said internal annular shoulder of the bonnet and said annular shoulder of the stuffing box, a first thrust bearing between the stem nut flange and the bonnet shoulder, a second thrust bearing between the stem nut flange and said stuffing box shoulder, said stem nut being engaged upon the threads of said stem and rotatable to move said gate, and a nut surrounding said bonnet and engaging the external threads of the lateral projection on said valve body for rotatably securing said stem nut to said stuffing box and clamping said beveled end of the stuffing box to the beveled sealing surface of the lateral projection of said valve body, said internal annular shoulder of the bonnet being spaced a predetermined fixed distance from said other end of the bonnet to positively maintain running clearance for the flange of the stem nut and said thrust bearings between the internal shoulder of the bonnet and said shoulder of the stuffing box.

3. A gate valve comprising a valve body having a flow passage and a lateral projection, said lateral projection containing a gate-receiving chamber which extends through the lateral projection and intersects the flow passage, said lateral projection having a sealing surface on the outer end thereof, a valve gate movable within said chamber, a threaded stem secured to said gate for moving the gate in said gate-receiving chamber, a stuffing box surrounding the stem for sealing thereagainst, said stuffing box having an external flange adjacent its lower end and a fixed annular shoulder at its upper end, a bonnet for said valve placed over said stuffing box, said bonnet having an internal annular shoulder adjacent its upper end, the lower end of said bonnet being in pressure engagement with the flange of said stuffing box, a threaded stem nut having an annular flange placed between the internal annular shoulder of said bonnet and the annular shoulder of said stuffing box, said nut being engaged with said stem and rotatable to move said gate, means engaging said bonnet and engaging the lateral projection for securing said stem nut to the stuffing box and clamping said lower end of said stuffing box in sealing engagement with the sealing surface of said lateral projection, the internal annular shoulder of said bonnet being spaced a predetermined fixed distance from said lower end of the bonnet to positively maintain running clearance for the flange of the stem nut between the internal shoulder of said bonnet and the fixed shoulder of the stuffing box.

References Cited by the Examiner

UNITED STATES PATENTS

| | | | |
|---|---|---|---|
| 2,674,436 | 4/54 | Jones | 251—267 |
| 2,744,775 | 5/56 | Bredtschneider | 277—113 |
| 2,780,233 | 2/57 | Volpin | 251—267 X |
| 3,026,084 | 3/62 | Bryant | 251—327 X |
| 3,042,361 | 7/62 | Garrott | 251—327 X |

FOREIGN PATENTS 532,732  11/56  Canada.

M. CARY NELSON, *Primary Examiner.*